Figure 1:
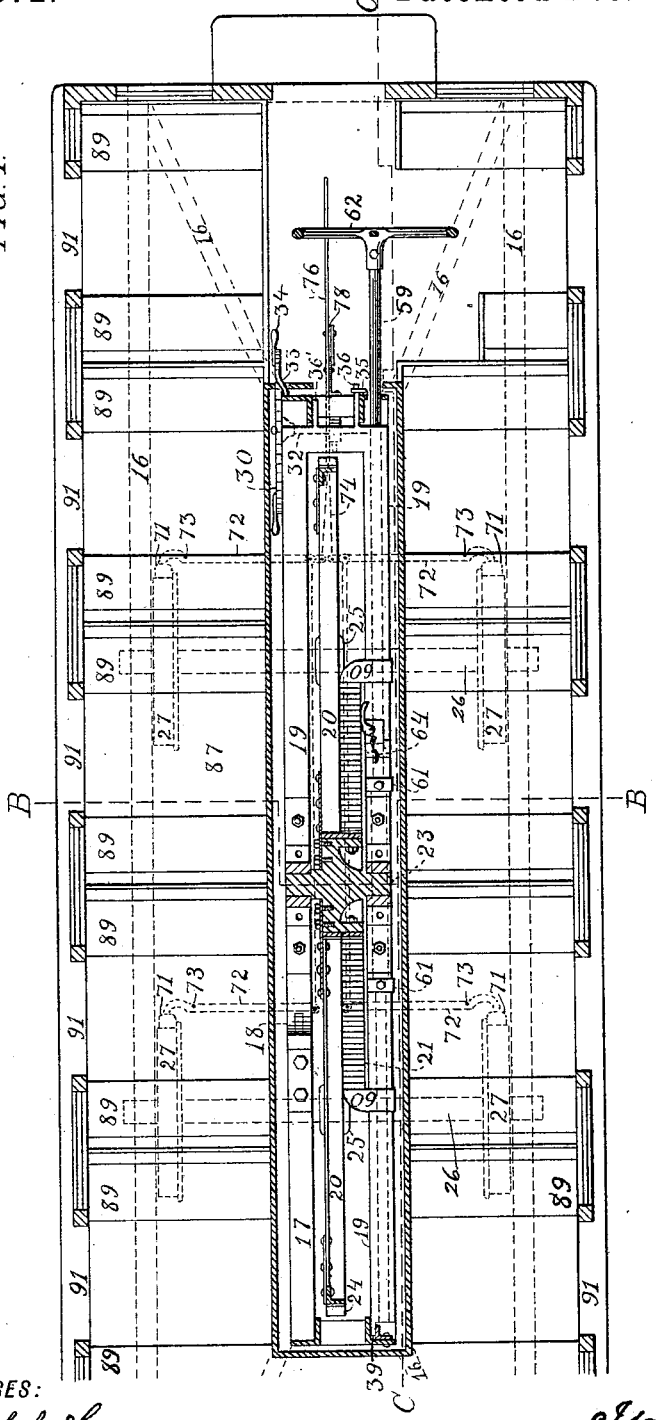

(No Model.) 5 Sheets—Sheet 1.

I. HODGSON.
MOTOR FOR STREET CARS.

No. 394,572. Patented Dec. 18, 1888.

WITNESSES:
Olof Hanson
Herbert T. Hazleton.

INVENTOR.
Isaac Hodgson,

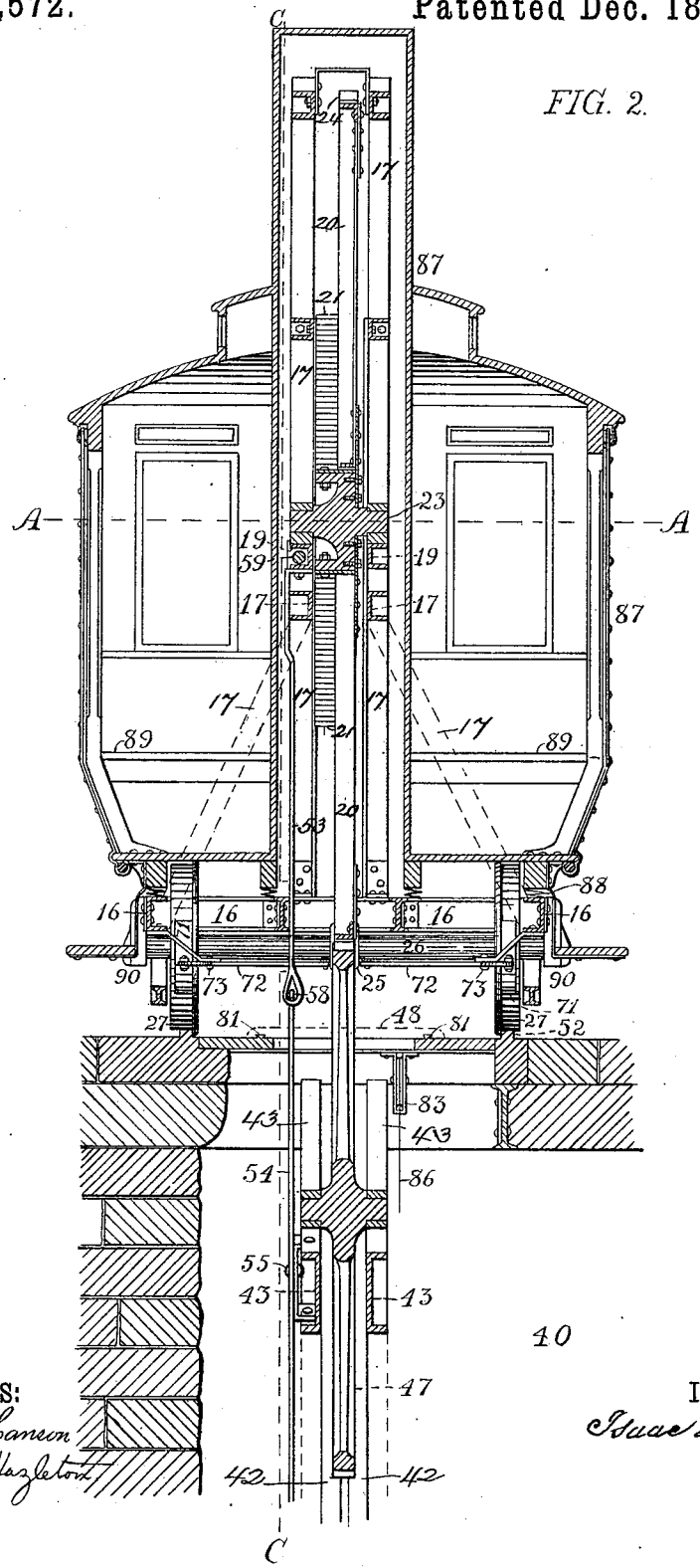

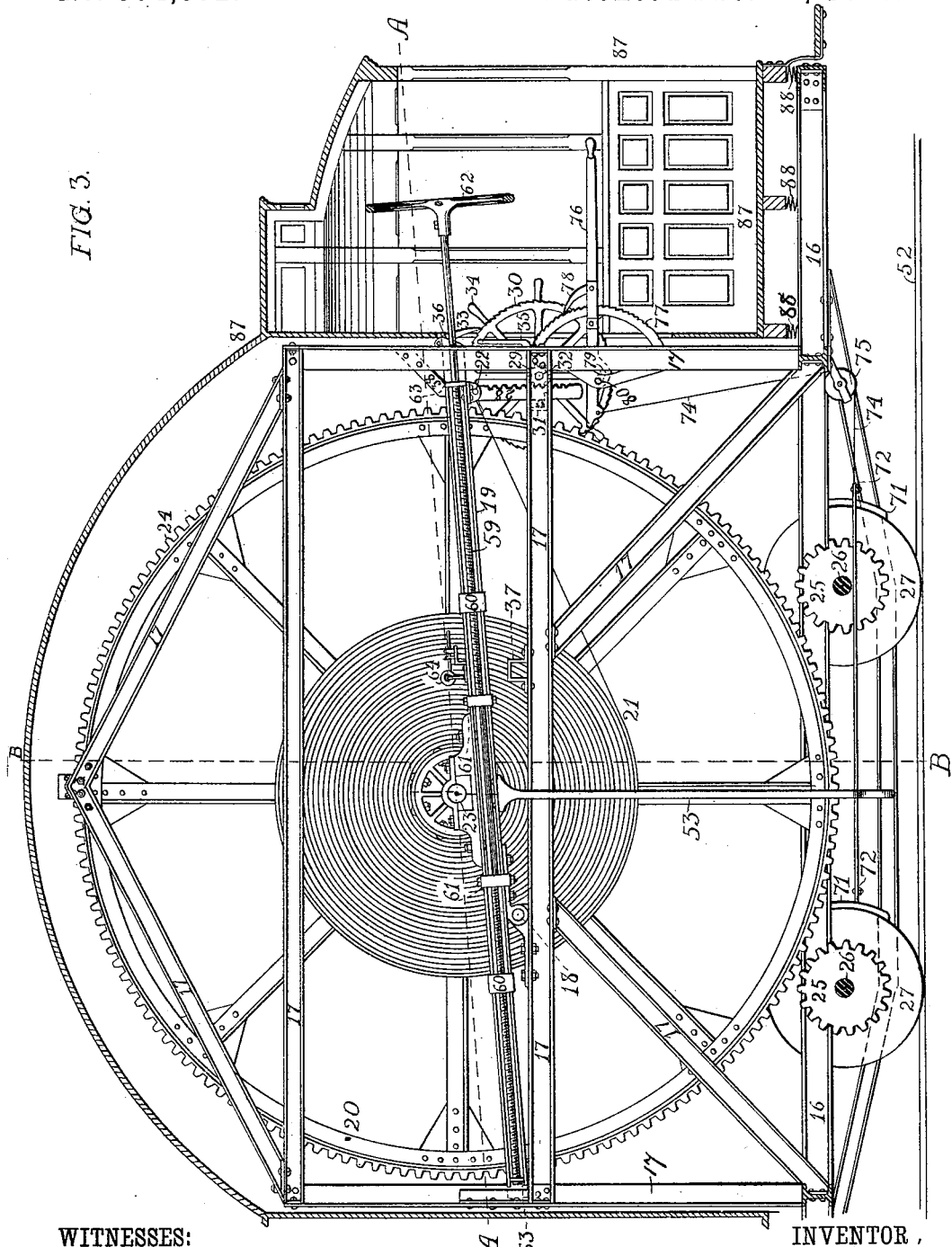

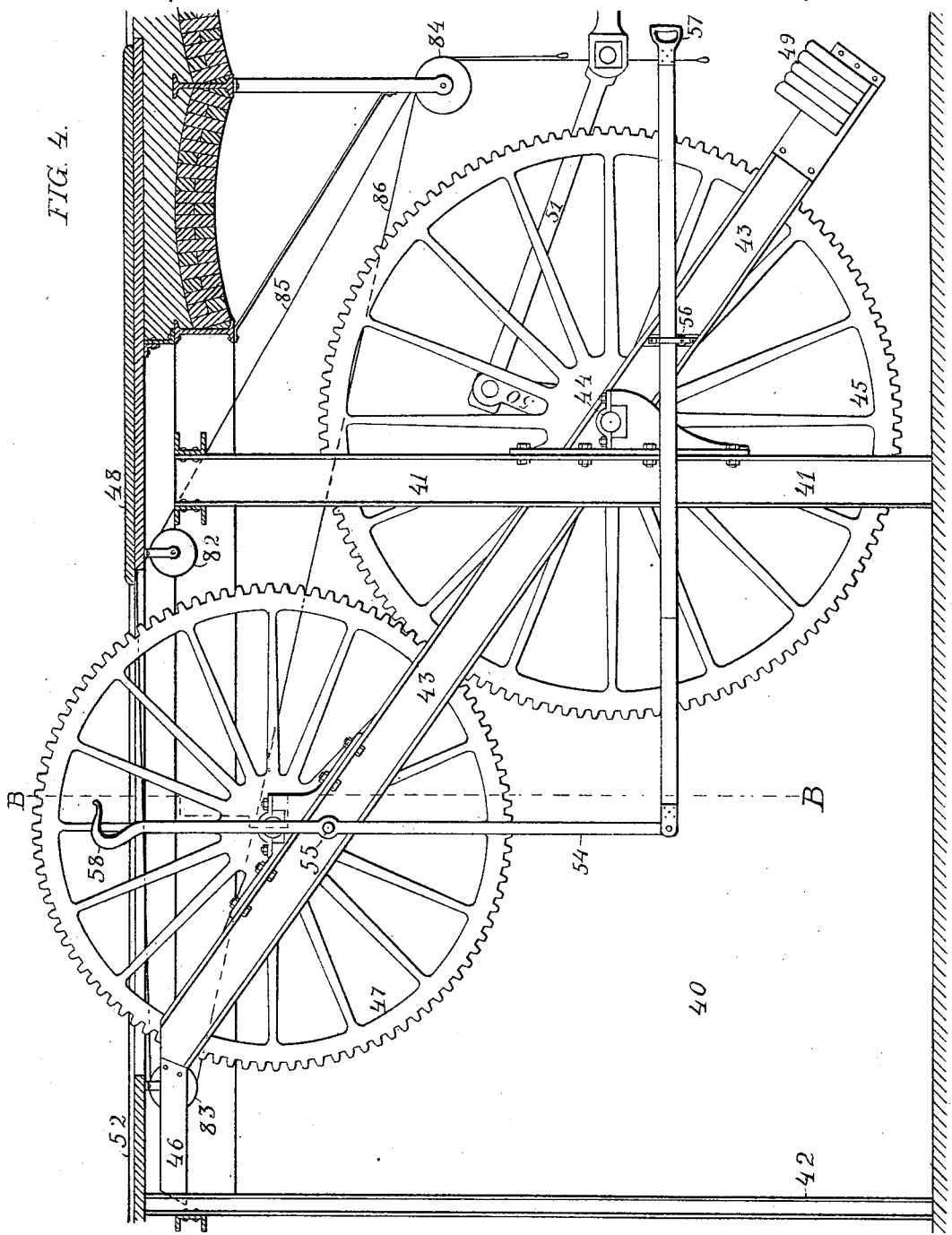

(No Model.) 5 Sheets—Sheet 5.
I. HODGSON.
MOTOR FOR STREET CARS.
No. 394,572. Patented Dec. 18, 1888.
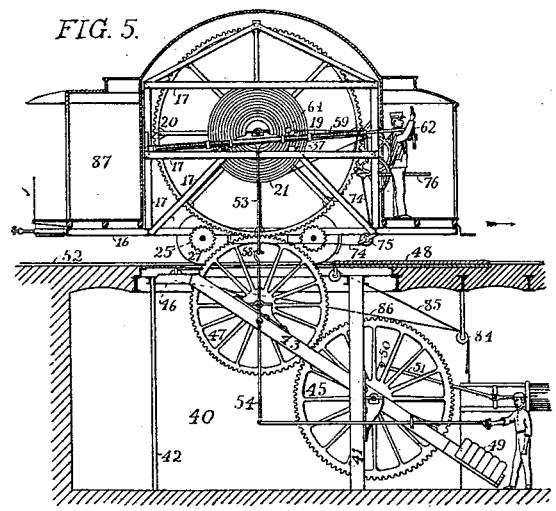
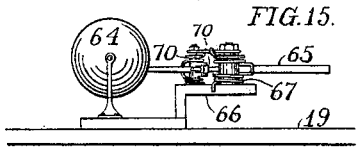
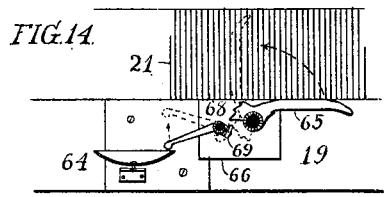
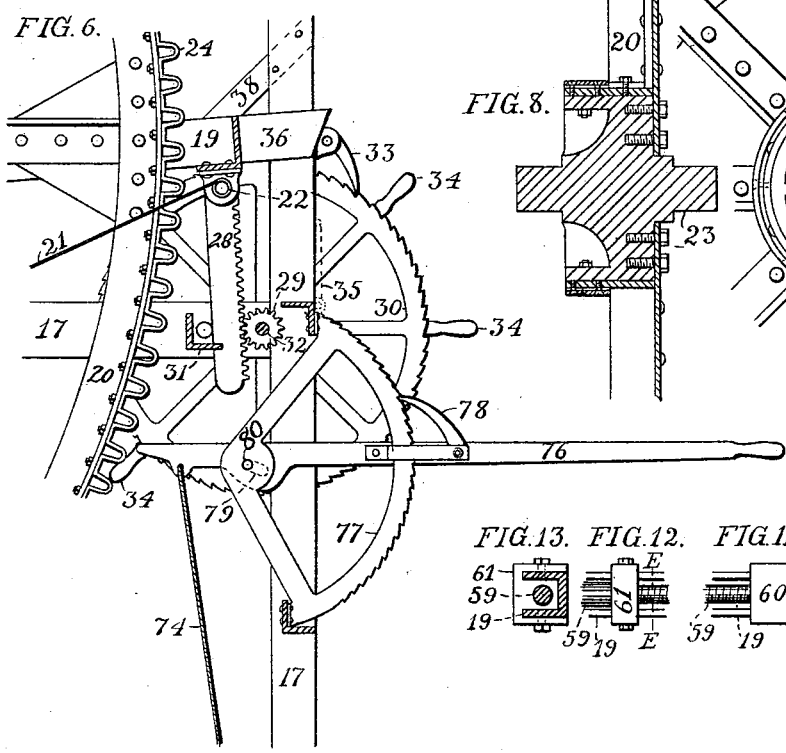
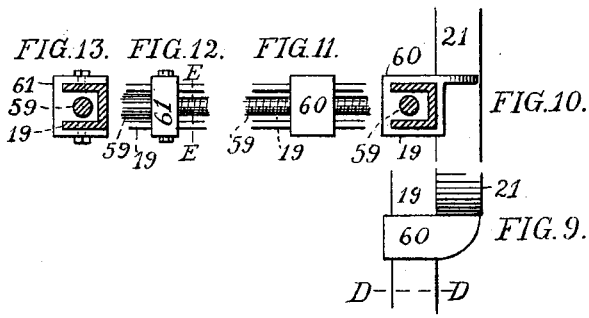
WITNESSES:
Olof Hanson.
Herbert T. Hazleton.
INVENTOR,
Isaac Hodgson

UNITED STATES PATENT OFFICE.

ISAAC HODGSON, OF OMAHA, NEBRASKA.

MOTOR FOR STREET-CARS.

SPECIFICATION forming part of Letters Patent No. 394,572, dated December 18, 1888.

Application filed May 26, 1888. Serial No. 275,264. (No model.)

*To all whom it may concern:*

Be it known that I, ISAAC HODGSON, a citizen of the United States, residing at Omaha, in the county of Douglas and State of Nebraska, have invented a new and useful Motor for Street-Cars and other Similar Vehicles, of which the following is a specification.

My invention relates to improvements in spring-motors for street-cars and other similar vehicles; and the objects of my improvements are, first, to provide devices for placing, adjusting, and controlling such motors in the cars; second, to provide devices for winding these motors by a system of gearing in chambers placed at convenient intervals below the track; and, third, to provide certain combination and arrangement of the parts for producing the required results. I attain these objects by the mechanism illustrated in the accompanying drawings, of which—

Figure 1 is a plan or horizontal section of a part of the car on line A A of Figs. 2 and 3, showing the frame of the car, the motor, governor, car-wheels, wheel-brakes, and lever, and also seats in position. Fig. 2 is a transverse vertical section on line B B of Figs. 1, 3, and 4, partly in elevation, showing the motor in position in the car on the track, and showing also a part of the winding machinery and coupling-bar in the chamber below the track. Figs. 3 and 4 are longitudinal vertical sections on line C C of Figs. 1 and 2, partly in elevation, Fig. 3 showing the motor, governor, lifting-jack, and car-wheel brakes in position in the car, and Fig. 4 showing the winding machinery and coupling-bar in the chamber below the track. Fig. 5 is a longitudinal vertical section on line C C of Figs. 1 and 2, partly in elevation, to a reduced scale, showing the entire car and motor in position on the track in connection with the winding machinery in the chamber below the track, as it appears during the process of winding the spring, which is shown partly wound, and which, when unwound, extends to the rim or inner periphery of the motor-wheel. Fig. 6 is a detailed elevation, to an enlarged scale, of the brake-lever, jack, ratchet-wheel, and ratchets, and also a part of the rim and teeth or cogs of the motor-wheel and the spring, partly in section, showing the mode of securing the outer end of the spring to the reciprocating frame. Fig. 7 is a detailed elevation, to an enlarged scale, of the hub and a part of the spokes of the motor-wheel, and Fig. 8 a section of same. Fig. 9 is a detailed plan, to an enlarged scale, of the clamp and a part of the reciprocating frame and motor-spring, the latter being in section. Fig. 10 is a section at D D of Fig. 9, showing a part of the spring in elevation. Fig. 11 is a detailed elevation of the clamp, to an enlarged scale, showing also a part of the screw-governor and reciprocating frame. Fig. 12 is a detailed elevation, to an enlarged scale, of the journal-boxes of the screw-governor, showing also a part of the screw and reciprocating frame. Fig. 13 is a section at E E of Fig. 12. Fig. 14 is a detailed plan of the alarm-bell, to an enlarged scale, showing also a part of the reciprocating frame and motor-spring, the latter and a part of the bell being in section. Fig. 15 is a detailed elevation of said bell, showing also a part of the reciprocating frame upon which it is secured.

Similar figures refer to similar parts throughout the several views.

In constructing motors of this character there is provided a frame, 16, which consists of suitable material, preferably channel and other bars and plates of steel, properly secured together, and upon the frame 16, which is the carrying and sustaining frame of the car and motor, an upright frame, 17, is constructed; and it consists, also, of channel, angle, and other bars of steel secured together and to the frame 16 in such manner as to adapt these frames for the reception and retention in their proper positions of the operating parts. All other parts not otherwise specified will be steel or other suitable metal. To the upright frame 17 is securely hinged at 18 a reciprocating frame, 19, upon which the motor-wheel 20 is mounted, and to the hub of the wheel 20 the spring 21, which is shown partly wound in the several views, is secured in the manner shown in detail in Fig. 7. The other end of said spring is provided with an eye, through which a pin, 22, is slipped and secured in lugs, which are attached to the end of the reciprocating frame 19, so that the frame 19 and the spring 21 may move freely together. The spring 21, being of sufficient length and strength for the traction and distance required, is coiled to a diameter equal to that of the interior periphery of the wheel 20, and tempered afterward, and secured in proper position and turned or wound about six times round to produce the initial force equal to the traction or power required to start the car or train of cars.

For lightness and convenience of construction and repairs, the motor-wheel 20 is composed of suitable angle and other bars and plates of steel secured together and to the hub or axle 23, of cast-iron or other suitable metal. (See detailed Figs. 7 and 8.) The teeth or cogs 24 of this wheel are of steel or other appropriate metal, formed separately and secured to the rim or periphery in the manner shown in detail in Fig. 6, or in any other suitable way.

Toothed wheels or pinions 25 are secured to the axles 26 of the car-wheels 27, directly under the motor-wheel 20, and to freely gear with it. Said pinions 25 will be cast-iron or other suitable metal, and for convenience of attachment and repairs are made each in two parts.

During the process of winding the spring 21, and at other times when its use can be advantageously dispensed with, the wheel 20 and pinions 25 must be thrown out of gear. For the purpose of providing means by which this can be quickly and safely effected, the reciprocating frame 19 is provided with a lifting-jack, which consists of a rack, 28, pinion 29, and a ratchet-wheel, 30. The rack 28 is securely pivoted to the reciprocating frame 19, and fitting in a grooved cross-bar, 31, (see Fig. 6,) which is secured to the frame 17, is held securely in position, with freedom of vertical motion and resistance to the lateral thrust of the pinion 29. This pinion 29 is secured on the shaft 32, whose journals are fitted to the frame 17, and upon one end of this shaft the ratchet-wheel 30 is secured and provided with a ratchet, 33. For safety of manipulation, said wheel 30 is provided with handles 34, by means of which the motor-wheel 20 is raised, and by the ratchet 33 securely held out of gear with the pinions 25, in which position it is shown in the several views. By a reverse motion of said wheel 30 the motor-wheel 20 is quickly lowered to gear with the pinions 25, and when pressed down to a position on the bolsters, hereinafter referred to, is securely held in position by means of a keeper, 35, pivoted to the frame 17, and provided with a suitable spiral spring, the recoil of which forces said keeper over the arm 36 of the reciprocating frame 19. Thus the motor-wheel 20 and pinions 25 are securely held in gear when the car is in motion. Said arms 36 and 36' are secured to the reciprocating frame 19, and serve to guide the frame in its vertical motion, as well as to prevent lateral displacement.

Bolsters or rests 37, referred to above, are secured to the frame 17, and serve to sustain the reciprocating frame 19 when the motor-wheel 20 and pinions 25 are in gear, and when out of gear to prevent the reciprocating frame 19 from being forced above a proper limit of height a stop, 38, is secured to the frame 17. To the rear end of the reciprocating frame 19 a short arm, 39, is secured to work in a slot, as shown in Fig. 1. Thus the reciprocating frame is securely held against the possibility of lateral displacement and with freedom of vertical motion upon the hinge at 18.

In motors of this class it is important that means be provided for winding the spring, and also for holding the car firmly on the track during the process of winding. For this purpose there is provided a chamber, 40, below the track, in which are secured in proper position suitable posts, 41 and 42. Between the posts 41 a frame, 43, having a reciprocating motion on the axle 44 of the wheel 45, is placed and provided with a projecting arm, 46, which enters a slot between the posts 42, thus securing and guiding the upper end of the frame 43 in direct vertical line with the wheels 45 and 47, which are always in gear. Thus the wheel 47 on the frame 43 can be quickly lowered below the sliding door 48, and also raised into gear with the motor-wheel 20, the axes of this wheel 20 and of the wheels 47 and 45 all being at right angles to a common vertical plane passing through their centers.

The reciprocating frame 43 at its lower end is provided with a suitable arm, upon which weights 49 are placed to counterbalance the wheel 47. The wheel 45 is provided with a crank, 50, outside of the reciprocating frame 43, connecting with a shaft, 51, of an engine of any suitable construction and power, by which the train of geared wheels 45, 47, and 20 can be driven, thus winding the motor-spring 21 and preparing the car or train of cars to proceed to the next winding-station at any convenient distance, preferably not less than one mile.

To keep the car firmly on the track and the wheels 20 and 47 securely in gear while winding the spring, a rod, 53, is secured to the reciprocating frame 19, and at the lower end provided with an eye, into which a hook, hereinafter mentioned, enters at a proper distance above the street. To the reciprocating frame 43 (see Fig. 4) a coupling-bar, 54, is securely pivoted at 55, and, extending over the anti-friction roller at 56, is provided with a handle at 57, and also with a hook at 58, (referred to above,) which enters the eye of the rod 53, thus holding the car firmly in position, and also the wheels 20 and 47 securely in gear with each other, and affording facilities for a person in the chamber 40 to quickly couple and uncouple or gear and ungear the wheels 20 and 47.

In order to regulate the motion of the car, it is necessary to control the motor-spring 21. This is done by means of a governor, which consists of a right and left screw-shaft, 59, working in clamps 60, which are securely mounted to freely travel on the reciprocating frame 19 and in boxes 61 and at the ends 63, so that by turning the wheel 62 the clamps 60 are forced toward or from the center, or forward and backward, as required, thus pressing and controlling the motor-spring 21 and regulating the motion of the car.

When the motor-spring 21 is wound to a proper tension, and to avoid accident from overstraining, an alarm-bell, 64, mounted on the reciprocating frame 19, gives a signal. This bell, which is automatic in its operation, (see Figs. 14 and 15,) is provided with an arm or lever, 65, which is pivoted to the carriage 66 and provided with a spiral spring, 67, and also teeth 68, adjusted to the lever 69 on the base of the hammer of the bell, which hammer, also, is pivoted to the carriage 66 and provided with a spiral spring, 70. When the motor-spring 21 is wound to the limit of safety, the lever 65 is turned round, by the recoil of the spiral spring 67, to the position shown in dotted lines in Fig. 14, and in its motion the teeth 68 push upon the lever 69, forcing the hammer to the position shown by dotted lines in Fig. 14, and when said lever 69 is relieved by the passage of each tooth the recoil of the spring 70 causes the hammer to strike the bell 64, which by three strokes distinctly indicates the safe limit to which the spring should be wound. As the motor-spring 20 unwinds, the lever 65 is forced back to the position shown in Figs. 14 and 15, and to enable the teeth 68 to return past the lever 69 this lever is free to move laterally away from the said teeth when pressed by them, and when the teeth have passed a suitable spring back of said lever 69 forces it back to its original position, ready for the next occasion.

To retard and stop the motion of the car-wheels 27, brakes 71 are connected with levers 72, which have their fulcrums at 73, and are connected with the cables 74, which pass under the anti-friction pulleys 75, and up to the end of the lever 76, to which they are secured. The lever 76 is provided with a segmental guide, 77, secured to the frame 17, and toothed on the outer edge to receive the ratchet 78, which is pivoted to the lever 76. When this lever 76 is pressed downward, it operates upon the cables 74, levers 72, and brakes 71, thus braking the car-wheels 27. The lever 76 is further utilized as a pinch-bar. Being provided with a slot, 79, adapted to a fulcrum, 80, which is independently secured, it is thrust forward on said fulcrum 80 between the teeth of the motor-wheel 20, and thus used to pinch or turn the said wheel 20 upward and downward, and the car backward and forward to any desired position on the track.

For public protection and to securely close the space in the street necessarily occupied by the wheel 47 during the process of winding the motor-spring 21, a suitable door, 48, is provided and, to prevent displacement or removal, mounted on a dovetail track, 81, (see Fig. 2,) and operated by means of suitable cables secured to either end of the door and extending over pulleys 82, 83, and 84 down to the hand of a person in the chamber 40. Cable 85 opens and cable 86 closes the door 48, which is shown open in the several views.

For traffic and convenience of passengers, the car 87, partly shown in Figs. 1, 2, 3, and 5, and which by preference is made of suitable wood constructed so as to be conveniently slipped over the vertical frame 17 and securely set on spiral or other suitable springs, 88, (but which springs form no part of my present invention,) on the metallic sustaining-frame 16, with freedom of motion in every direction, and provided with seats 89, preferably arranged back to back between the side doors, 91.

To avoid unnecessary friction, the metallic sustaining-frame 16 is mounted on the car-wheels 27, the journals of whose axles rotate in anti-friction journal-boxes at 90, Fig. 2; but which journal-boxes form no part of my present invention.

I am aware that prior to my invention spring-motors have been made and used for various purposes. I therefore do not claim a spring-motor, broadly; but What I do claim as my invention, and desire to secure by Letters Patent, is—

1. The combination, in a street-car motor, of a carrying and sustaining frame, 16, vertical frame 17, and a reciprocating frame, 19, hinged at 18, and carrying the motor-wheel 20, coiled spring 21, bell 64, and governor, the latter consisting of a right and left screw-threaded shaft, 59, clamps 60, journal-b x 61 and 63, and hand-wheel 62, all substantially as shown and described, for the purpose set forth.

2. The reciprocating frame 19, having short arms 36, 36′, and 39, and keeper 35, substantially as shown, for the purpose specified.

3. In a street-car motor, the combination of the motor-wheel 20, pinions 25, and a jack, the latter consisting of a rack, 28, pinion 29, shaft 32, and ratchet 33, substantially as shown, and for the purpose set forth.

4. In a street-car motor, the combination of geared wheels 45 and 47, mounted in a frame, 43, reciprocating on the axle 44 of the wheel 45, which is carried by the posts 41, the frame 43 being guided in its reciprocating motion by the arm 46 and posts 42, and counterbalanced at 49 in the chamber 40, and also the chamber 40 below the track or roadway, substantially as shown and specified, and for the purpose set forth.

5. In a street-car motor, the combination of a coupling-rod, 53, and bar 54, the latter being pivoted at 55 to the reciprocating frame 43 and passing through a keeper on an anti-friction roller at 56, secured to said frame 43, and having a handle, 57, by which it is operated, and a hook, 58, adapted to the eye of the rod 53, which is secured to the reciprocating frame 19, substantially as shown and described, for the purpose specified.

6. The combination of a sliding door or cover, 48, dovetail track 81, cables 85 and 86, and pulleys 82, 83, and 84, substantially as shown, and for the purpose specified.

7. In a street-car motor, the combination of the wheel-brakes 71, levers 72, and cables 74, secured to the levers 72, and also to the lever 76, the latter being provided with a ratchet, 78, adapted to the teeth in the segmental guide 77, and also with a slot, 79, adapted to the fulcrum 80, substantially as shown and specified, for the purpose set forth.

8. A street-car motor consisting of a passenger-car, 87, inclosing the motor and adapted to the carrying and sustaining frame 16 and upright frame 17, all substantially as shown and specified, for the purpose set forth.

ISAAC HODGSON.

Witnesses:
OLOF HANSON,
HERBERT T. HAZLETON.